United States Patent [19]

Medlin

[11] 4,135,337
[45] Jan. 23, 1979

[54] MOUNTING MEANS FOR ELECTRIC OUTLET BOX

[76] Inventor: Lewis B. Medlin, 735 S. 26th Pl., Arlington, Va. 22202

[21] Appl. No.: 832,383

[22] Filed: Sep. 12, 1977

[51] Int. Cl.² ............................................. H02G 3/08
[52] U.S. Cl. ....................................... 52/221; 220/3.3; 220/3.92; 248/228
[58] Field of Search .................... 52/220, 221, 27 R; 220/3.9, 3.92, 3.94, 3.2, 3.3; 248/228, 205; 174/50 R

[56] References Cited

U.S. PATENT DOCUMENTS

| 1,620,063 | 3/1927 | Bowers | 220/3.4 |
| 1,705,768 | 3/1929 | Johnson | 220/3.4 |
| 1,722,430 | 7/1929 | Kelly | 220/3.4 |
| 1,790,031 | 1/1931 | Vaughn | 270/3.9 |
| 3,146,298 | 8/1964 | Ceglia | 52/221 |
| 3,588,019 | 6/1971 | Cozeck | 220/3.9 |
| 3,596,860 | 8/1971 | MacKay | 220/3.9 |
| 3,780,209 | 12/1973 | Schuplin | 248/205 R |

FOREIGN PATENT DOCUMENTS

| 799636 | 11/1968 | Canada | 220/3.9 |
| 1445182 | 8/1976 | United Kingdom | 248/228 |

*Primary Examiner*—Ernest R. Purser
*Assistant Examiner*—Henry Raduazo
*Attorney, Agent, or Firm*—Peck & Peck

[57] ABSTRACT

A bracket for mounting an electrical outlet box on vertical metal studs in a building or the like structure. The bracket including a channel shaped sheet metal element adapted to be clamped on and affixed to the vertical metal stud. The clamping element, including a pair of arms spaced apart by means of a web and one of said arms, is doubled back or lapped on itself and spot-welded or otherwise affixed to the arm. Welded or otherwise affixed to the doubled back portion of the arm laterally extends a member provided with an opening therein beyond which extends a solid portion. The opening receives a standard electrical plaster or dry wall ring with is joined to a standard electrical outlet box by screws. The dry wall ring is provided with open-ended slots therein through which the screws extend and are threaded into the outlet box, the position of the outlet box relative to the dry wall ring being adjustable by merely sliding the screws out of the open-ended slots in the dry wall ring. A modified form of the mounting ring includes on the other arm of the channel shaped element the doubled back construction and the laterally extending member so that one vertical metal stud will receive the clamping element and the members will extend laterally from each side thereof.

6 Claims, 7 Drawing Figures

MOUNTING MEANS FOR ELECTRIC OUTLET BOX

BRIEF SUMMARY OF THE INVENTION

It is standard practice at the present time to use metal studs in new building construction and substantial problems have been encountered in the mounting and supporting on and from these metal studs of electrical outlet boxes, telephone jacks or sockets, and the like. While this development is disclosed in the drawings herein as being adapted for use in walls, it is to be distinctly understood that this novel mounting means is applicable for securing such electrical outlet boxes and the like on ceilings, plaster or dry wall, where there may be no studs. If have overcome the problems which heretofore have been inherent in the securing of these outlet boxes to the metal studs. As far as I am aware, the methods which have been practiced in the prior art for securing various types of outlet boxes to the studs have been time-consuming and therefore expensive, and the outlet boxes in many instances, when mounted under the prior practices, are not in the proper angular relationship with the studs or other elements involved in the mounting arrangement. The mounting means of this invention is relatively inexpensive to produce, may be mounted on the studs with facility, and overcomes the prior difficulties.

Generally, this invention involves a bracket arrangement including a channel member from which laterally extends means mounting and affixing thereto the outlet box, and includes an element which covers the rim of the outlet box and provides a plaster or dry wall ring which is fastened by means of screws to the outlet box. The channel member includes a unique construction whereby the necessary support is given to the outlet box to thereby prevent it from being pushed back or inwardly so that it would not be in the proper angular relationship with respect to the stud. It is standard practice to use metal studs which have a linear beading at their edges and this unique construction of the channel member also functions to accommodate this bead over which the channel member is clamped and prevents an undesirable and improper angular relationship of the outlet box with respect to the stud.

Outlet boxes may have different sized and differently spaced openings therein so that it often occurs that the position of the outlet box with relation to the dry wall ring must be varied according to the dimensions and spacing of the openings in the outlet box. The dry wall ring which is fastened to and supports the outlet box is so constructed that the position of the outlet box relative to the dry wall ring may be varied in an expeditious manner.

It is conventional in this art to provide metal studs of generally channel construction so that a stud will involve a pair of arms connected together in spaced apart relation by means of a web. If the element which extends laterally from the channel member which is fixed to the stud extends from the open side of the stud, the heretofore mentioned unique construction of the channel shaped member prevents the outlet box from being pushed toward the stud into misalignment.

In many building constructions of the general character in which I am interested, it is desirable to mount an electric outlet box to a metal stud at one side thereof and on the other side of the stud to mount a telephone outlet box. This produces a duplex arrangement and where this arrangement is desired, the channel member which is affixed to the metal stud is provided with a laterally extending electrical outlet box mounting on one side and a further laterally extending telephone jack on the other side thereof, and in both of these constructions the unique construction of the channel member is provided.

Additional objects and advantages of the present invention will become more readily apparent to those skilled in this art when the following general statements and descriptions are read in the light of the appended drawings.

DETAILED DESCRIPTION

Figure 1:
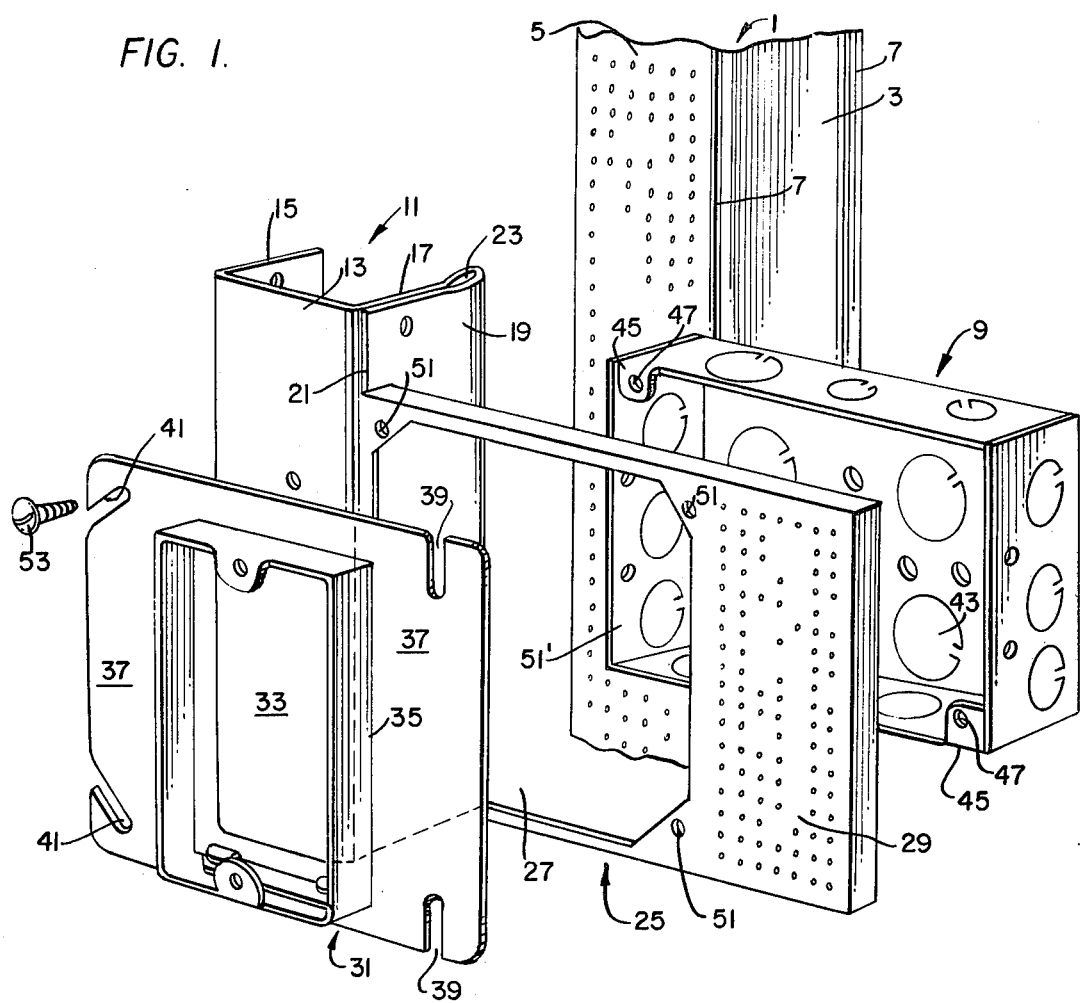
FIG. 1 is an exploded view in perspective of the mounting means for an electric outlet box.

It is conventional at the present time to use metal vertical studs in building construction. Such studs are generally of channel configuration providing a web from which extend a pair of parallel arms. Normally, such vertical metal studs are provided with a bead along the line of juncture between each side of the web and the parallel arms. In building construction which use metal studs a definite problem has been presented in the mounting to the metal studs of electrical outlets, telephone jacks or sockets, where plaster or dry wall rings are used. I have overcome this problem in a manner to be described. It is also within my contemplation to adapt the arrangement for mounting these units to walls or ceilings or plaster or dry wall where there are no studs.

As far as I am aware the methods which are now in use for attaching electric junction boxes to metal studs are not efficient, are time-consuming, and each outlet box may only be mounted in a non-complex manner on one side of the vertical metal stud. One of the difficulties which has heretofore been encountered is mounting these outlet boxes, and the like, in a simple way so that the plaster or dry wall ring, which constitutes one of the components of the arrangement, will be flush with the wall. It has been my experience that with the mounting arrangement and method to be hereafter described in detail that even an apprentice in this field can mount the outlet box in a secure manner and the plaster or dry wall ring will be even with the wall.

The various components which produce my highly advantageous mounting arrangement are not more costly than the arrangements hitherto used and are substantial in their labor saving and time reducing attributes.

In many buildings, such as office buildings, an electrical outlet box is provided on one side of the metal stud and a telephone outlet is provided on the opposite side thereof. I have devised a twin or duplex mounting arrangement whereby the electric outlet box may be mounted on one side of the stud and the telephone outlet on the other side of the stud quickly and with facility. The mounting means which I have provided, where the duplex or twin outlets are used, comprises generally a unitary structure providing means for mounting each of these boxes on opposite sides of the stud in a simple and rapid manner thereby reducing installation time and resultant labor costs.

Since many outlet boxes are of combination type having varying sizes of knockout discs which are variably spaced, I have provided simple means whereby the outlet box may be positioned relative to the other components of the mounting means to accommodate these variations in size and spacing of the knockout discs.

In the accompanying drawings I have used the numeral 1 to designate in its entirety a vertical metal stud upon which the mounting means is mounted and affixed. The metal stud 1 comprises a web 3 from the edges of which a pair of substantially parallel arms 5 extend at right angles thereto. While only one of such arms 5 is illustrated, it will be understood that the other arm extends from the other edge of the web 3 and these arms are substantially parallel. It is conventional practice in this art to provide beads 7 along the lines or juncture between the arms 5 and the web 3. The metal studs 1, as will be apparent, are of generally channel configuration.

The mounting arrangement for the electric outlet box consists in part of a channel support member or bracket indicated in its entirety by the numeral 11. The channel support member 11 is preferably formed of sheet metal and is adapted to fit snugly, squarely, and plumb around a metal stud 1, in a generally clamping manner, all as will become apparent as this description proceeds. The channel support member or bracket 11 comprises a web 13, an arm 15 extending from one side thereof, and a further arm 17 which extends from the opposite edge of the web generally parallel to arm 15, the arm 17 being doubled back on itself or lapped providing an outer folded over portion 19 which is spot welded to the arm 17 adjacent to its free edge at 21. It will be apparent from consideration of the drawing that a slight space or open area 23 is preferably provided between the arm 17 and the folded over portion 19, the space being adjacent to the fold. The mounting means also includes a laterally extending frame or supporting member designated in its entirety by the numeral 25 which is affixed in any suitable manner preferably to the folded over portion 19 adjacent the outer or free edge thereof. The laterally extending member 25 is provided with a cutout or opening 27 therethrough which is substantially dimensionally the same as the interior dimensions of an electric outlet box 9. A solid section 29 is provided on the outer end or portion of the member 25, and it will become apparent that this solid portion 29 provides extra metal support adjacent to the opening 27 for extra dry wall support, as well as reinforcing means for member 25, as will be explained in detail hereafter.

The mounting means of my invention includes a generally rectangular metal, plaster or dry wall ring designated generally by the numeral 31. The plaster or dry wall ring 31 is provided with a cutout section or opening 33 which is rimmed by an upstanding collar 35. The remaining outer portion of the plaster or dry wall ring being of solid construction is illustrated at 37. Adjacent to but removed from the corners at one side of the plaster or dry wall ring 31 are inwardly directed slots 39, each slot extending tending from and through the edge of the ring 31 and extending a distance inwardly thereof. Adjacent to but removed from the other side of the ring 31 are a pair of slots 41 which extend through the edge of the ring and inwardly a distance, and it is to be noted that these slots are angled with respect to the edge of the ring through which they extend and that the upper slot angles upwardly, while the lower slot is angled downwardly. In certain situations the electric junction box, where there are no studs, is mounted on the laterally extending member 25 and the dry wall is affixed by screws, or the like, to the solid portion 29 thereof and to the web 13 of support member or bracket 11.

The electric junction box 9 may be combination box and is provided with any desirable number of knockout discs 43 which may be of different sizes and may be differently spaced apart, depending upon the particular usage. The electric junction box 9 is provided with a pair of tabs 45 having threaded holes 47 therein to receive screws, as will be explained.

Figure 2:
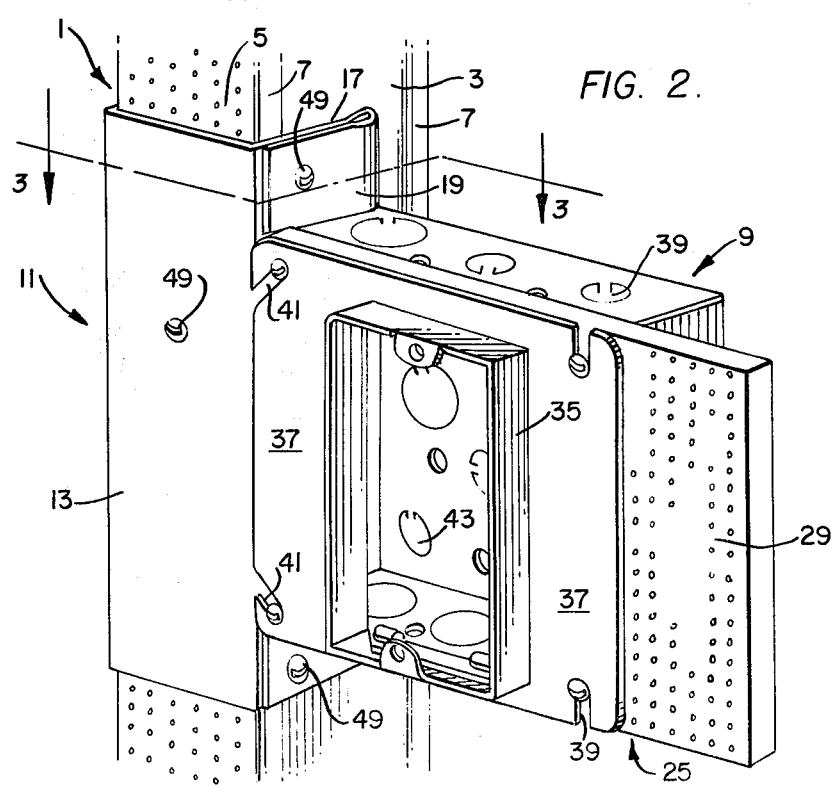
FIG. 2 is a view in perspective of the various components in operative mounted position on a metal stud.
Figure 3:
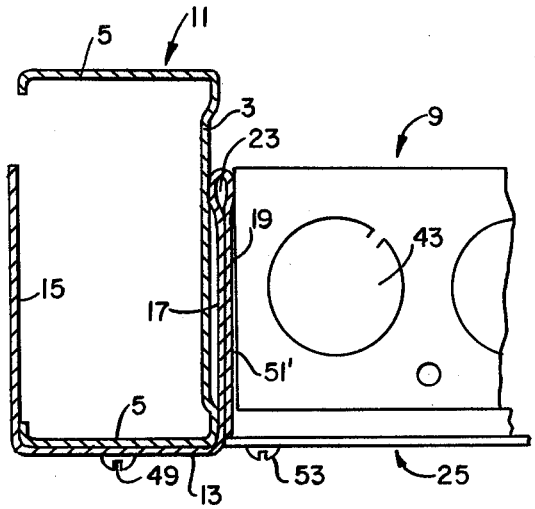
FIG. 3 is a view taken on the line 3—3 of FIG. 2.
Figure 4:
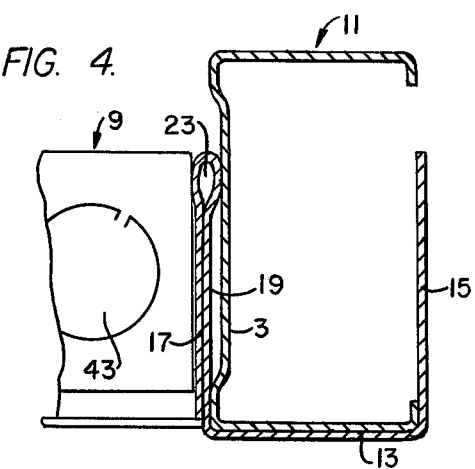
FIG. 4 is a vertical sectional view in reverse of the view of FIG. 3.
Figure 5:
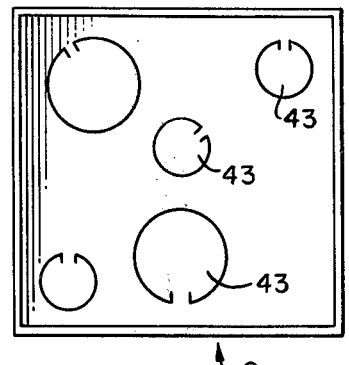
FIG. 5 is a plan view of an electric control box showing different sizes and spacing of the knockouts for receiving therethrough the electric wires.

In use the channel support or bracket member 11 is slid over the stud 1, in more or less clamping position as illustrated particularly in FIG. 2, and when so mounted the web 13 of the bracket is in abutment with the arm 5 of the stud and the arm 17 thereof is in abutment with the web 3 of the metal stud. The bracket 11 is firmly affixed to the stud 1 by means of any desirable number of screws 49 extend through the folded over portion 19, the arm 17 and into the stud, and also through web 13 and into arm 5. With the bracket mounted and affixed on the stud as described, the laterally extending member 25 which is preferably integral with the folded over portion 19 of the bracket 11 will project from the bracket and the metal stud, all as particularly disclosed in FIG. 2. Whereupon the electric junction box 9 is brought into position with the holes 47 and tabs 45 lined up with the screw holes 51 in the laterally projecting member 25 and the plaster or dry wall ring 31 is positioned on the opposite side of the laterally extending member 25 from that side against which the electric junction box 9 is disposed and the ring 31 is positioned so that the slots 41 therein are lined up with the openings 47 and 51. Screws 53 are extended through the slots 41 and openings 51 and are threaded into the threaded holes 47 and further screws are disposed in the slots 39 through the openings 51 are threaded into the threaded hole 47 in the lower tab 45. It will now be evident that a unitary structure is provided wherein the bracket 11 is solidly affixed to the metal stud 1 and the components, including the electric junction box 9 and ring member 31, are affixed in proper position to the laterally extending member 25 and supported thereby. With the mounting arrangement, including the components formed into a unitary structure as described, it will be clear that the wall 51' of the junction box 9 will abut against the folded over or lapped portion 19 of the arm 17. As I have stated hereinabove, it is essential that the junction box 9 be positioned relative to the metal stud 1 so that it extends in a plane substantially perpendicular to the plane of the web 3. This folded over construction insures that the electric junction box 9 will always assume the proper relationship with respect to the stud 1 and it takes care of the bead 7 on the metal stud 1, were it not for this folded over construction, the bead would cause the junction box 9 to assume an undesired attitude with respect to the stud.

When the components are unitized as illustrated in FIG. 2. the plaster or dry wall may be applied thereover and if desired secured to the solid portion 29 of the laterally extending member 25 by means of screws or the like, and it will be understood that the upstanding collar may be adapted with facility to different thicknesses of plaster or dry wall.

While I have shown in FIGS. 1 and 2 the arm 17 of the bracket 11 in abutment with the web 3 of the metal stud this position may be altered in certain installations. For instance, the bracket 11 may be so mounted on an arm of the stud so that the web 13 of the bracket will be in abutment with web 3 of the stud. It will be appreciated that when so mounted, the arm 17 will not be in abutment with any part of the stud and in this case the electric junction box 9 will be mounted in proper and desired angular relationship with respect to the stud 11 due to the folded over construction of the arm 17 as shown in 19.

Figure 6:
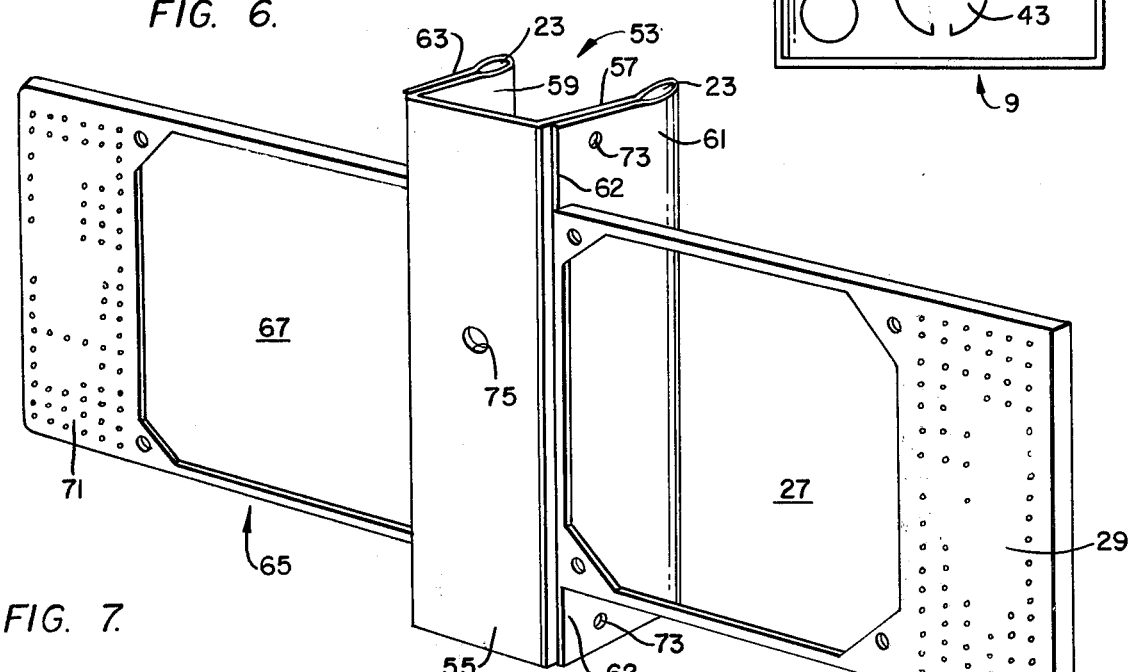
FIG. 6 is a view in perspective illustrating a modified form of a duplex mounting means for an electric outlet box and a telephone box.
Figure 7:
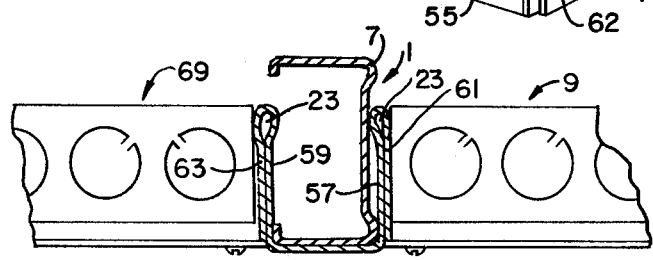
FIG. 7 is a plan view of the modified form of the invention as illustrated in FIG. 6, with parts thereof broken away.

A modified form of my invention is illustrated in FIGS. 6 and 7 and in the detailed description of this modified form, I shall use the same reference numerals for similar parts as heretofore used. This form of the invention is particularly adapted for use where an electric junction box is mounted on one side of the vertical stud while a telephone outlet is mounted on the opposite side of the stud. A single channel support or bracket member is used for mounting both the telephone outlet and the electric junction box and this bracket has been designated in its entirety by the numeral 53, and the bracket comprises a web 55 and a pair of arms extending from each edge of the web and these arms are designated by the numerals 57 and 59. The arm 57 is folded over or lapped on itself as at 61, and this folded over portion 61 is affixed by spot welding, or the like, 62 to the arm 57. The arm 59 is folded over or lapped on itself as at 63 and the free edge of the folded over portion 63 is affixed by spot welding or the like to the arm 59. It will be apparent that in this form of the invention each arm 57 and 59 of the bracket is folded over providing folded over portions 61 and 63, while in the form of the invention illustrated in FIGS. 1 and 2 only one arm of the bracket is folded over to provide a mounting means for the electric junction box components. Fixed to or integrally formed with and laterally extending from the folded over portion 61 is a member 26 which is structurally and operationally the same as the member 25 disclosed in FIGS. 1 and 2. The laterally extending member 26 is adapted to receive an electric junction box 9 and the plaster or dry wall ring 37, all of these components are mounted and joined together in the same manner as illustrated in FIG. 2 of the drawings and it is to be distinctly understood that in this modified form of the invention the electric junction box, the member 26, and the plaster or dry wall ring 31 (FIG. 1) are structurally the same as is disclosed in FIGS. 1 and 2. A further laterally extending member which is designated in its entirety by the numeral 65 is integrally formed with or fixed to and extends from the folded over portion 63 of the arm 59 of the bracket and this laterally extending member extends in the same projected plane as the member 26 on the opposite side of the stud 1. The member 65 is provided with an opening 67 therein which provides accessibility to the interior of the telephone box designated generally by the numeral 69 and this member 65 is also provided with the solid portion 71 at one end thereof, which is similar to and functions the same as the solid portion 29 which is provided on the other laterally extending member 26. It will now be understood that the member 26 functions as a mounting means for the electric junction box components, while the member 65 functions as a mounting means for a telephone outlet and its component parts. It is also to be understood that a plaster or dry wall ring 31 (FIG. 1) is mounted on the member 65 and secured to a telephone box 69, which is substantially the same as the electric outlet box 9 illustrated in FIGS. 1 and 2 of the drawings.

In use this twin or duplex arrangement, which is illustrated in FIGS. 6 and 7, is mounted on a vertical metal stud similar to the stud 1 of FIGS. 1 and 2, and the bracket 53, after being more or less clamped on the stud, is affixed thereto by screws which extend through the openings 73 and 75 in the arms of the web, respectively. It will now be clear that with the bracket 53 mounted on a metal sud as shown in detail in FIG. 7 that the members 26 and 65 will be properly positioned and will extend laterally from each side of the stud and that the electric outlet and telephone box will be maintained at all times in proper angular relationship with respect to the stud and the bracket in view of the lapped construction of the arms of the bracket.

What is claimed is:

1. Mounting means for an electric junction box, or the like, including in combination, a channel shaped bracket to be affixed to and about a stud in building construction, said bracket having a web and a pair of substantially parallel arms one extending from each edge of the web, a member fixed to and extending laterally from one of said arms of said bracket and having an opening therein, said laterally extending member being of planar shape and being substantially rigid, an electric junction box fixed to one side of said laterally extending member in position with respect thereto so that the interior of the electric junction box is accessible through said opening in the laterally extending member, and a dry wall ring fixed to the other side of said laterally extending member and said electric junction box and said laterally extending member maintaining said electric junction box and said dry wall ring in operative position.

2. Mounting means for an electric junction box in accordance with claim 1, wherein one of said arms of said bracket is lapped and the free edge of the folded over portion of said arm is fixed to said arm along the free edge of the folded over portion and said laterally extending member being affixed to said folded over portion, and said electric junction box being in abutment with said folded over portion a space being provided between said one of said arms and said folded over portion solely along the point of folding.

3. Mounting means for an electric junction box and a telephone outlet box including, in combination, a channel shaped bracket adapted to be affixed to and about a stud in building construction, said bracket having a web and a pair of substantially parallel arms extending from each edge of the web, a member affixed to and extending laterally in opposite directions from each of said arms of said bracket and each laterally extending member having an opening therein, an electric junction box affixed to one of said laterally extending members in position with respect thereto so that the interior of the electric junction box is accessible through the opening in said laterally extending member, a telephone outlet box affixed to the other of said laterally extending members in position with respect thereto so that the interior of the telephone outlet box is accessible through the opening in said laterally extending member, and a dry wall ring affixed to each of said laterally extending members and to said electric junction box and telephone outlet box, respectively, and said laterally extending members maintaining said electric junction box, said telephone outlet box and said dry wall ring in operative position.

4. Mounting means for an electric junction box and a telephone outlet box in accordance with claim 3, wherein a channel shaped vertical metal stud is provided and said bracket is affixed to and about the stud and said laterally extending members project in opposite directions from said arms on each side of said vertical metal stud.

5. Mounting means for an electric junction box and a telephone outlet box in accordance with claim 3, wherein each of said arms of said bracket is lapped and the free edge of the folded over portion of each of said arms is affixed to said arm along the free edge of the folded over portion and each of said laterally extending members being affixed to a folded over portion, and said electric junction box being in abutment with one of said folded over portions and said telephone outlet box being in abutment with said other folded over portion.

6. Mounting means for electric equipment including support means therefor adapted to be fixed to a vertical stud in building construction, said vertical stud having at least two sides and said support means embracing at least two sides of said vertical stud, a planar member of substantially rigid construction fixed to and extending from said support means, a dry wall ring and said dry wall ring being connected to said member and supported thereby in operative position and an electric junction box adapted to be fixed to said dry wall ring and said member.

* * * * *